United States Patent
Yuan et al.

(10) Patent No.: US 11,722,271 B2
(45) Date of Patent: Aug. 8, 2023

(54) CHANNELIZED TRANSMISSION OVER OPENZR-EXTENDED OPTICAL NETWORK

(71) Applicant: FUJITSU LIMITED, Kawasaki (JP)

(72) Inventors: Catherine Yuan, Plano, TX (US); Muhammad S. Sarwar, Easton, CT (US); Malleswaraprasad Sunkara, Richardson, TX (US); Kentaro Nakamura, Plano, TX (US); Vijay Khopade, Murphy, TX (US); Albert Smith, Richardson, TX (US); Calvin Wan, Plano, TX (US); Dave Howell, Anna, TX (US); Jeffrey Holt, Allen, TX (US); Sanjay Gera, Plano, TX (US)

(73) Assignee: FUJITSU LIMITED, Kawasaki (JP)

( * ) Notice: Subject to any disclaimer, the term of this patent is extended or adjusted under 35 U.S.C. 154(b) by 165 days.

(21) Appl. No.: 17/389,166

(22) Filed: Jul. 29, 2021

(65) Prior Publication Data

US 2023/0037189 A1   Feb. 2, 2023

(51) Int. Cl.
   *H04L 5/00*   (2006.01)
   *H04L 12/40*   (2006.01)

(52) U.S. Cl.
   CPC .......... *H04L 5/0046* (2013.01); *H04L 5/0094* (2013.01); *H04L 12/4013* (2013.01)

(58) Field of Classification Search
   CPC .................................. H04L 5/00; H04L 12/40
   See application file for complete search history.

(56) References Cited

U.S. PATENT DOCUMENTS

| 10,750,260 B1* | 8/2020 | Gareau | H04Q 11/0066 |
| 2017/0311060 A1* | 10/2017 | Cai | H04Q 11/0062 |
| 2022/0046114 A1* | 2/2022 | Entelis | H04L 12/40 |

OTHER PUBLICATIONS

"Multi-link Gearbox Implementation Agreement", Optical Internetworking Forum, Apr. 2016, IA # OIF-MLG-03.0.
"Multi-link Gearbox Implementation Agreement", Optical Internetworking Forum, Apr. 2013, IA # OIF-MLG-02.0.
"Low Rate Service Multiplexing using FlexE for 400ZR Interfaces", OIF, OIF-400ZR-MUXING-01.0, Sep. 18, 2020.

* cited by examiner

*Primary Examiner* — Sulaiman Nooristany
(74) *Attorney, Agent, or Firm* — Maschoff Brennan

(57) ABSTRACT

According to an aspect of an embodiment, operations may include receiving a first Ethernet signal having a first data rate less than a second data rate, the second data rate being a ZR data rate. The operations may also include dividing the first Ethernet signal into a plurality of first-signal sub-signals that each have a third data rate that is less than the first data rate. Moreover, the operations may include generating a second Ethernet signal having the second data rate, the generating of the second Ethernet signal being based on the plurality of first-signal sub-signals such that the second Ethernet signal includes the plurality of first-signal sub-signals. Further, the operations may include providing the second Ethernet signal to a ZR network such that the second Ethernet signal is a ZR signal.

13 Claims, 7 Drawing Sheets

CHANNELIZED TRANSMISSION OVER OPENZR-EXTENDED OPTICAL NETWORK

FIELD

The embodiments discussed herein are related to channelization of OpenZR-Extended optical signals. The OpenZR-Extended technology support line rate x00G (including beyond 400G), to transport mix of FlexE client (ie, at the rate of 25G, 40G, 25G*m, m>=1 per OIF IA) and regular Ethernet (eg, 100GE, 200GE, 400GE and 800GE).

BACKGROUND

Telecommunications systems, cable television systems and data communication networks use optical networks to convey information between remote points. In an optical network, information is conveyed in the form of optical signals through optical fibers or other optical media.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, operations may include receiving a first Ethernet signal having a first data rate less than a second data rate, the second data rate being a ZR data rate. The operations may also include dividing the first Ethernet signal into a plurality of first-signal sub-signals that each have a third data rate that is less than the first data rate. In addition, the operations may include inserting a first respective alignment marker with respect to each respective first-signal sub-signal of the plurality of first-signal sub-signals. Moreover, the operations may include generating a second Ethernet signal having the second data rate, the generating of the second Ethernet signal being based on the plurality of first-signal sub-signals such that the second Ethernet signal includes the plurality of first-signal sub-signals, the respective first-signal sub-signals being delineated in the second Ethernet signal by their respective first alignment markers. Further, the operations may include providing the second Ethernet signal to a ZR network such that the second Ethernet signal is a ZR signal.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Optical networks are increasingly carrying more and more data such that different implementation agreements are being implemented to support high bandwidth transmission of data via optical networks. Further, the implementation agreements help carriers to mix and match coherent interfaces from different vendors across their respective networks.

Flexible Ethernet (FlexE) is an example implementation agreement that provides a generic mechanism for supporting a variety of Ethernet Media Access Control (MAC) rates. Further, a family of multiple long range (ZR) implementation agreements have been developed to define interoperable coherent interfaces for use with long range (e.g., 120 km) point-to-point data links. For example, 400ZR defines a 400 Gigabit (400G) coherent interface for use with long range point-to-point data links up to 120 km. Further, the Open ZR+ interoperability agreement relates to a potential range of solutions or operating modes for coherent solutions that may be outside of 400ZR. Open ZR+ is another agreement that focuses on optical specifications capable of flexible 100G-400G line rates and longer optical reaches than 400ZR. For example, Open ZR+ provides interoperable 100G, 200G, 300G, and 400G line rates over metro, regional, and long-haul distances, based on a new frame structure utilizing OpenFEC (oFEC) forward error correction and a set of 100-400G optical line specifications. In the present disclosure generic reference to "ZR" type signals, data rates, components, networks, etc. may refer to any signal, data rate, component, network, etc., that may be configured to operate within the specifications provided by any ZR type implementation agreement including, ZR, ZR+, Open ZR+, etc.

As detailed below, one or more embodiments of the present disclosure relate to channelized FlexE transmission of ZR signals. In particular, the channelized transmission may be such that a ZR signal communicated at a ZR data rate (e.g., 100G) may carry multiple lower-rate signals (e.g., 5G) that may derive from and that may be differentiated between different signal sources (e.g., different routers). The channelized transmission may allow for more flexibility and granularity in the transmission and distribution of data carried by ZR signals by allowing for Multiplexing a multiple channelized FlexE MACs into different 100G/200G/300G/400G/Beyond-400G OpenZR-Extended Transport Networks.

Embodiments of the present disclosure will be explained with reference to the accompanying drawings.

Figure 1A:
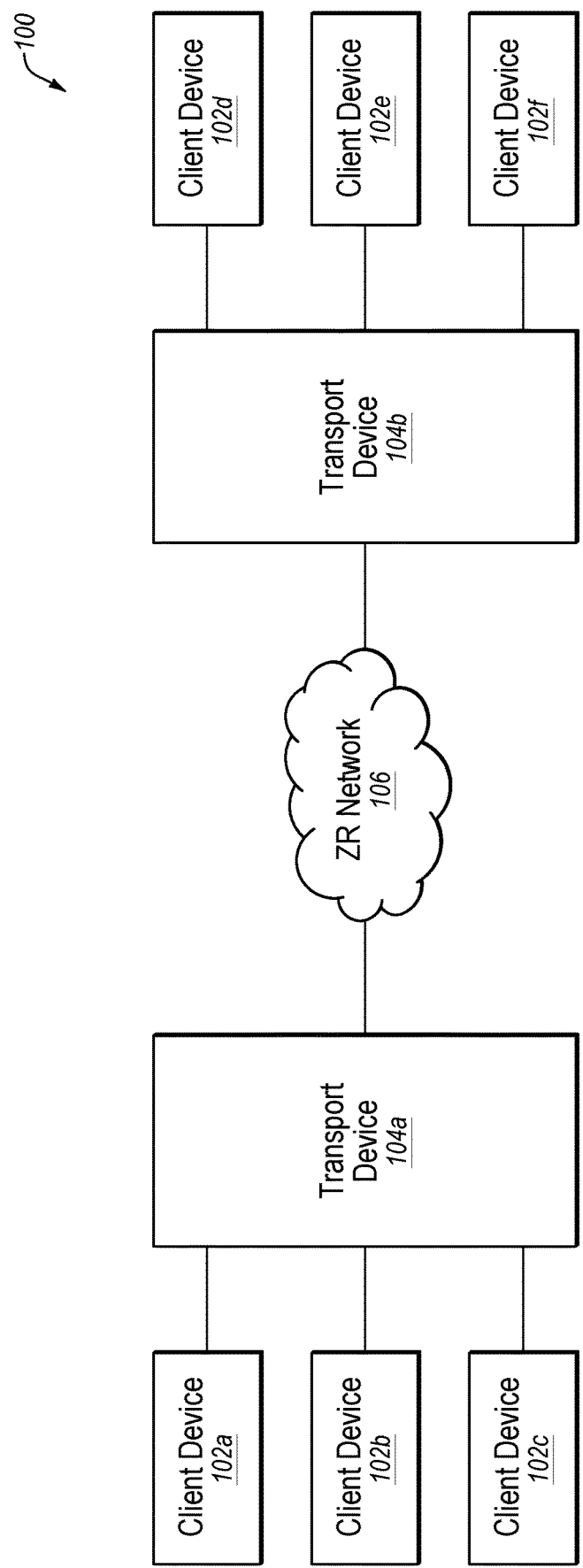
FIG. 1A illustrates an example embodiment of an optical system to perform channelization of ZR signals.

FIG. 1A illustrates an example embodiment of an optical system 100 ("system 100") configured to perform channelization of ZR signals, according to one or more embodiments of the present disclosure. The system 100 may include a client device 102a, a client device 102b, a client device 102c, a client device 102d, a client device 102e, and a client device 102d (referred to generally as "client devices 102"). Further, the system 100 may include a transport device 104a and a transport device 104b (referred to generally as "transport devices 104"). In addition, the system 100 may include a ZR network 106.

The client devices 102 may include any suitable system, apparatus, or device, configured to direct the communication of a client optical Ethernet signal. For example, in some embodiments, each of one or more of the client devices 102 may be a router configured to direct the communication of an optical Ethernet signal configured as a FlexE client, which may be an Ethernet flow of data that may be communicated based on a MAC data rate. For instance, the optical Ethernet signals that may be directed and communicated by the client devices may include a 10G-Base-R signal, a 25G-Base-R signal, a 40G-Base-R signal, a 50G Base-R signal, or any FlexE client signal that may be incremented by 25G, (i.e., 25*n, n>=2). The client devices 102 may include any suitable arrangement of electrical, optical, and/or electro-optical components and hardware configured to perform the operations described. Further, the client devices 102 may include any suitable computing system such as the computing system described below with respect to FIG. 3.

In some embodiments, the client devices 102 may be configured to direct signals that are to be communicated via the ZR network 106. Additionally or alternatively, the client devices 102 may be configured to receive signals that have been communicated via the ZR network 106 and may direct such signals to other elements. The Ethernet signals that are communicated by the client devices 102 may be referred to as "client signals."

The transport devices 104 may include any suitable system, apparatus, or device configured to interface between the client devices 102 and the ZR network 106. For example, in some embodiments the transport devices 104 may include any suitable arrangement of electrical, optical, and/or electro-optical components configured to perform the operations described. Further, the transport devices 104 may include any suitable computing system such as the computing system described below with respect to FIG. 3.

In some embodiments, the transport devices 104 may be configured to receive client signals from the client devices 102 and generate ZR signals based on the client signals. The transport devices 104 may be configured to provide the generated ZR signals to the ZR network 106 for communication via the ZR network 106. Reference to "ZR signals" in the present disclosure may relate to any suitable optical signal that may be communicated according to any applicable ZR operating agreement.

Additionally or alternatively, the transport devices 104 may be configured to receive ZR signals that are communicated via the ZR network 106. In these or other embodiments, the transport devices 104 may be configured to deconstruct the received ZR signals into individual client signals that are communicated to respective client devices 102.

In some embodiments, and as detailed below, the transport devices 104 may be configured to generate the ZR signals as channelized ZR signals in which the channelized ZR signals include multiple lower-rate signals that respectively correspond to one of the client signals. Further, the channelization may be such that each of the client signals may be divided into multiple sub-signals that are communicated at a data rate that is less than the data rate of the client signals.

For example, in some embodiments, the client signals may be 10G, 25G, 40G, or 50G signals. In these or other embodiments, the transport devices 104 may be configured to divide the client signals into 5G sub-signals. In these or other embodiments, the sub signals may be combined (e.g., via Time Division Multiplexing) into a 100G ZR signal. Additionally or alternatively and as discussed in further detail below, the transport devices 104 may be configured to include alignment markers with the sub-signals in which the alignment markers may delineate the different sub-signals within the 100G ZR signal. Further, as also discussed in further detail below, in some embodiments, the transport devices 104 may be configured to insert a respective indicator in each respective sub-signal, in which the respective indicator indicates from which client signal (and consequently from which client) the respective sub-signal derived. The above operations to generate the channelized ZR signal may be such that the client signals are transported over a collection of TDM multiplexed sub-signal resources (e.g., TDM multiplexed 5G resources) as part of the channelized ZR signal, which may provide extra granularity in the transportation of the client signals.

Further, the transport devices 104 may be configured to receive the channelized ZR signals and separate out the different sub-signals included in the respective channelized ZR signals. For example, the transport devices 104 may be configured to pull the sub-signals out of the channelized ZR signals by reading the alignment markers to differentiate between the different sub signals. Additionally or alternatively, the transport devices 104 may be configured to identify the source of the respective sub-signals based on the indicators included therein. In these or other embodiments, identification of the respective sources of the respective sub-signals may help facilitate the transportation of the respective client signals over a collection of TDM multiplexed sub-signal resources (e.g., TDM multiplexed 5G resources). In these or other embodiments, the transport devices 104 may be configured to direct the reconstructed client signals to a corresponding destination client device 102.

The ZR network 106 may be any suitable optical network configured to communicate signals according to any applicable ZR based operating agreement. For example, the ZR network 106 may include different transmission rates, modulation scheme, baud, rates, distances, etc., that may related to communication of optical signals according to a ZR operating agreement. For instance, the transmission rates may include 100G, 200G, 300G, 400G, etc. The modulation formats may any suitable modulation scheme that may be used to encode the information including any suitable polarization multiplexed or dual-polarization modulation scheme. For example, the modulation schemes may include a dual-polarization (DP) modulation scheme that may include a dual-polarization quadrature phase-shift keying (DP-QPSK) modulation scheme, a DP-8PSK modulation scheme, a DP-16PSK modulation scheme, or any applicable dual-polarization quadrature amplitude modulation (DP-QAM) scheme (e.g., DP-QAM, DP-8QAM, DP-16QAM, etc.). The baud rate may include 32 Gbaud, 60 Gbaud, 64 Gbaud, etc. The distances may include ranges from 50 km to over 3000 km.

The ZR network 106 may include a point-to-point optical network with terminal nodes, a ring optical network, a mesh optical network, or any other suitable optical network or combination of optical networks. For example, the optical network may include nodes that are configured to communicate information to each other via optical signals transmitted through optical fibers.

Figure 1B:
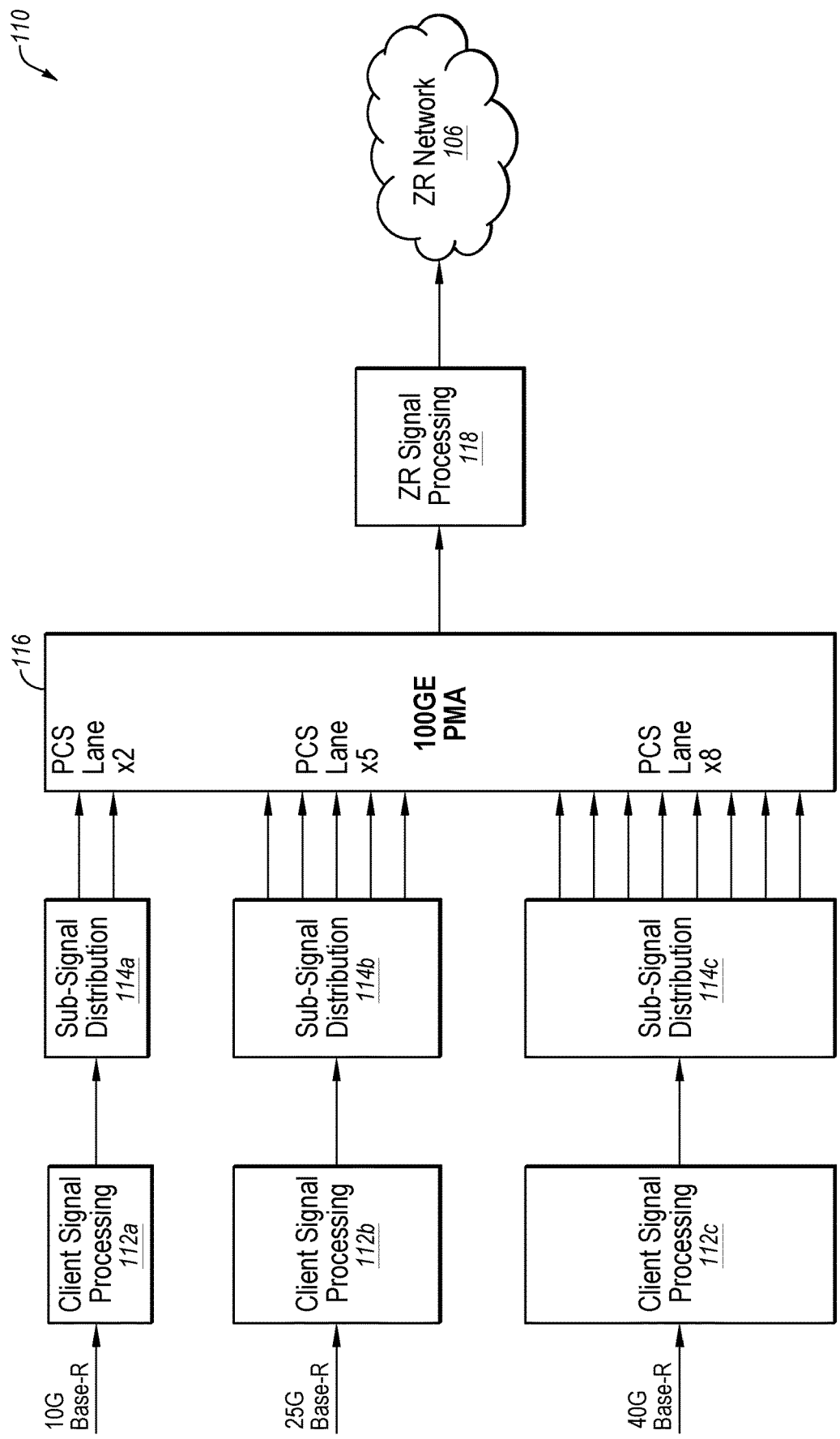
FIG. 1B illustrates example transmit operations that may be performed by the transport devices of FIG. 1A.

FIG. 1B illustrates example transmit operations 110 that may be performed by the transport devices 104, according to one or more embodiments of the present disclosure. The transmit operations 110 may include operations performed with respect to one or more client signals received from a client device 102 to generate a channelized ZR signal.

In the example of FIG. 1B, the transmit operations 110 may be performed with respect to a first client signal derived from a first client device, a second client signal derived from a second client device, and a third client signal derived from a third client device. For example, referring to FIG. 1A, the first client signal may be communicated by the client device 102a and received by the transport device 104a, the second client signal may be communicated by the client device 102b and received by the transport device 104a, and the third client signal may be communicated by the client device 102b and received by the transport device 104a. In the example of FIG. 1B, the first client signal may be a 10G signal, the second client signal may be a 25G signal, and the third client signal may be a 40G signal. However, these are merely examples and analogous transmit operations may be performed with respect to any other applicable combination of client signals and the associated MAC rates of the received client signals.

The transmit operations 110 may include performing client signal processing operations ("client signal operations 112") with respect to the respective received client signals. For instance, client signal operations 112a may be performed with respect to the first client signal, client signal operations 112b may be performed with respect to the second client signal, and client signal operations 112c may be performed with respect to the third client signal. The client signal operations 112 may include scrambling the respective client signals, inserting or removing inter-frame gaps in the respective client signals, etc.

The transmit operations 110 may also include distribution operations 114, which may include dividing the respective client signals into sub-signals and distributing the respective sub-signals to a respective Physical Coding Sublayer (PCS) lane that may correspond to a sub-signal data rate. In some embodiments, the sub-signals may have a sub-signal data rate that is less than that of the client signal from which they were derived. Further, the number of sub-signals that correspond to a respective client signal may be based on the relationship between the sub-signal data rate and the data rate of the respective client signal.

For example, the first client signal may be a 10G signal and the sub-signals may be 5G signals. As such, the first signal may be divided into two separate 5G first signal sub-signals. Further, each 5G first signal sub-signal may be assigned a respective 5G PCS lane Similarly, the second client signal may be a 25G signal and the sub-signals may be 5G signals. As such, the second signal may be divided into five separate 5G second signal sub-signals. Further, each 5G second signal sub-signal may be assigned a respective 5G PCS lane. As another example, the third client signal may be a 40G signal and the sub-signals may be 5G signals. As such, the third signal may be divided into eight separate 5G third signal sub-signals. Further, each 5G third signal sub-signal may be assigned a respective 5G PCS lane.

In these or other embodiments, the distribution operations 114 may include inserting alignment markers into each respective sub-signal in which the alignment markers may provide a delineation of each respective sub-signal. The insertion of the alignment markers may be performed according to any suitable technique.

Additionally or alternatively, the distribution operations 114 may include inserting an indicator in each respective sub-signal to indicate from which client signal the respective sub-signal was derived. For example, in some embodiments, the indicator may indicate a tributary port number associated with the client signal. In these or other embodiments, the indicator may be included in a media slot identifier (MSI) overhead field of respective packets that may be included in the respective sub-signals. In some embodiments, the MSI overhead field may include 8 bits and the 2 most significant bits and the 2 least significant bits may be reserved for indicating tributary port numbers of ZR signals of which the sub-signals may be included. However, the middle 4 bits of the MSI overhead field may be used for the indicator for each respective sub-signal.

For example, the first client signal may include data packets that are associated with a first TPN. In some embodiments, the middle 4 bits of each MSI field of the packets of each respective sub-signal that derives from the first client signal may indicate the first TPN by having a value of "0000." As another example, the second client signal may include data packets that are associated with a second TPN. In some embodiments, the middle 4 bits of each MSI field of the packets of each respective sub-signal that derives from the second client signal may indicate the second TPN by having a value of "0001." Similarly, as another example, the second client signal may include data packets that are associated with a second TPN. In some embodiments, the middle 4 bits of each MSI field of the packets of each respective sub-signal that derives from the third client signal may indicate the third TPN by having a value of "0010." The above are merely example values that may be used to indicate from which client signal the sub-signals derived.

In these or other embodiments, the transmit operations 110 may include time division multiplexing operations 116 (TDM operations 116). The TDM operations 116 may include combining the sub-signals, as received from their respective PCS lanes, in a manner that creates a channelized ZR signal that includes the sub-signals. The TDM operations 116 may include any suitable TDM technique and may be such that each sub-signal is included in a respective time slot of the channelized ZR signal. In these or other embodiments, the sub-signals of the channelized ZR signal may be delineated in the channelized ZR signal by their respective alignment markers.

Figure 1C:
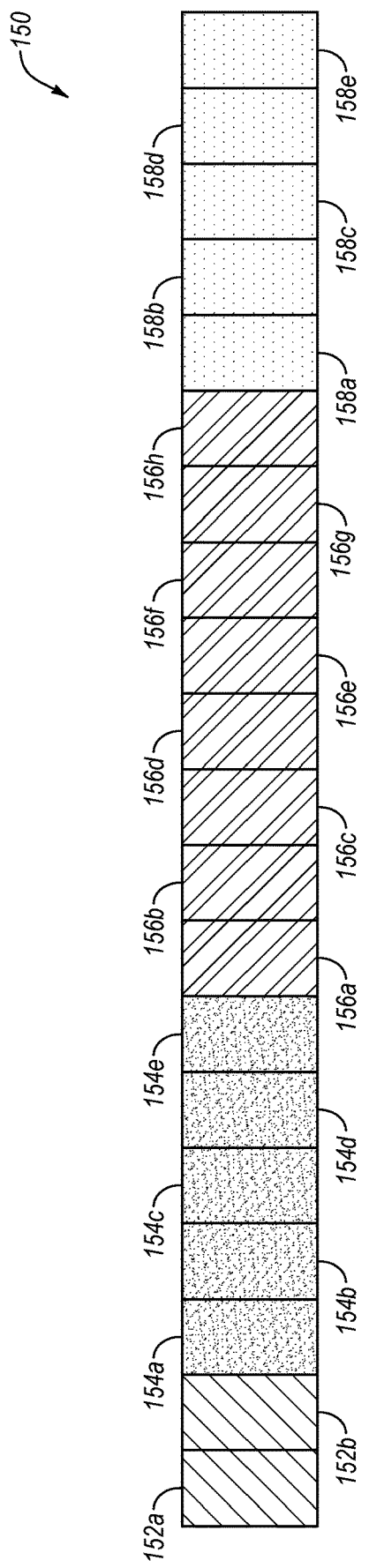
FIG. 1C illustrates an example channelized signal.

By way of example, FIG. 1C illustrates an example channelized signal 150 ("signal 150") that may be generated from the TDM operations 116. The signal 150 may be a channelized 100G signal that is divided into twenty time slots that each correspond to a 5G sub-signal and that may be delineated according to their respective alignment markers. Further, each 5G sub-signal may correspond to a respective client signal and may include therein an indication as to from which client signal the respective sub-signals derived.

For example, the signal 150 may include first signal sub-signals 152a and 152b, which may be derived from the 10G first client signal of FIG. 1B. In the illustrated example, the first signal sub-signals 152 may be assigned to time slots 1 and 2, respectively of the signal 150 and may each include an indicator to indicate that they derive from the 10G first client signal (e.g., may include in an MSI header a TPN associated with the 10G first client signal). Additionally, the signal 150 may include second signal sub-signals 154a, 154b, 154c, 154d, and 154e, which may be derived from the 25G second client signal of FIG. 1B. In the illustrated example, the second signal sub-signals 154 may be assigned to time slots 3-7, respectively, of the signal 150 and may each include an indicator to indicate that they derive from the 25G second client signal (e.g., may include in an MSI header a TPN associated with the 25G second client signal). Further, the signal 150 may include third signal sub-signals 156*a*, 156*b*, 156*c*, 156*d*, 156*e*, 156*f*, 156*g*, and 156*h*, which may be derived from the 40G third client signal of FIG. 1B. In the illustrated example, the third signal sub-signals 156 may be assigned to time slots 8-15, respectively, of the signal 150 and may each include an indicator to indicate that they derive from the 40G third client signal (e.g., may include in an MSI header a TPN associated with the 25G third client signal). In addition, the signal 150 may include fourth signal sub-signals 158*a*, 158*b*, 158*c*, 158*d*, and 158*e*, which may be derived from a 25G fourth client signal (not explicitly discussed with respect to FIG. 1B). In the illustrated example, the fourth signal sub-signals 158 may be assigned to time slots 16-20, respectively, of the signal 150 and may each include an indicator to indicate that they derive from the 25G fourth client signal (e.g., may include in an MSI header a TPN associated with the 25G third client signal). Accordingly, the signal 150 may be a 100G ZR signal that is channelized according to different 5G sub-signals. The signal 150 is merely given as an example channelized 100G ZR signal such that different channelized ZR signals may be different. For example, the association of the different sub-signals with different client signals having different MAC rates may vary with different 100G ZR signals.

Returning to FIG. 1B, the transmit operations 110 may also include ZR signal processing operations 118 ("ZR operations 118") that may be configured to provide the channelized signal generated at the TDM operations 116 to a ZR network (e.g., the ZR network 106 of FIG. 1A). For example, the ZR operations 118 may include performing any suitable mapping procedure (e.g., GMP ("Generic Mapping Procedure")) to map the received channelized signal into a ZR Optical Transport Network (OTN) signal such that the channelized signal is configured as a channelized ZR signal.

In some embodiments, the channelized ZR signal may be provided directly to the ZR network to be communicated according to a 100G ZR communications protocol. In these or other embodiments, the channelized ZR signal may be combined with one or more other channelized or un-channelized ZR signals to be communicated according to a higher rate ZR protocol.

For example, in some embodiments, the channelized ZR signal may be a 100G signal that may be combined with another 100G ZR signal to generate a 200G ZR signal according to any suitable technique. In these or other embodiments, the channelized ZR signal may include another set of alignment markers embedded therein to delineate the 100G channelized ZR signal from the other 100G ZR signal of the 200G ZR signal. In these or other embodiments, the channelized ZR signal may include indicators that differentiate the source of the channelized signal as compared to the other ZR signal of the 200G ZR signal. For example, the two MSB and the two LSB of the MSI overhead fields associated with the channelized ZR signal may provide such an indication according to current techniques. Additionally or alternatively, the channelized ZR signal may be combined with three other 100 ZR signals to generate a 400G ZR signal according to any suitable technique. In these or other embodiments, the ZR operations 118 may include inserting additional alignment markers and indicators in the channelized ZR signal similar to described above with respect to insertion of such elements as described above with respect to inclusion of the channelized ZR signal in a 200G ZR signal.

Figure 1D:
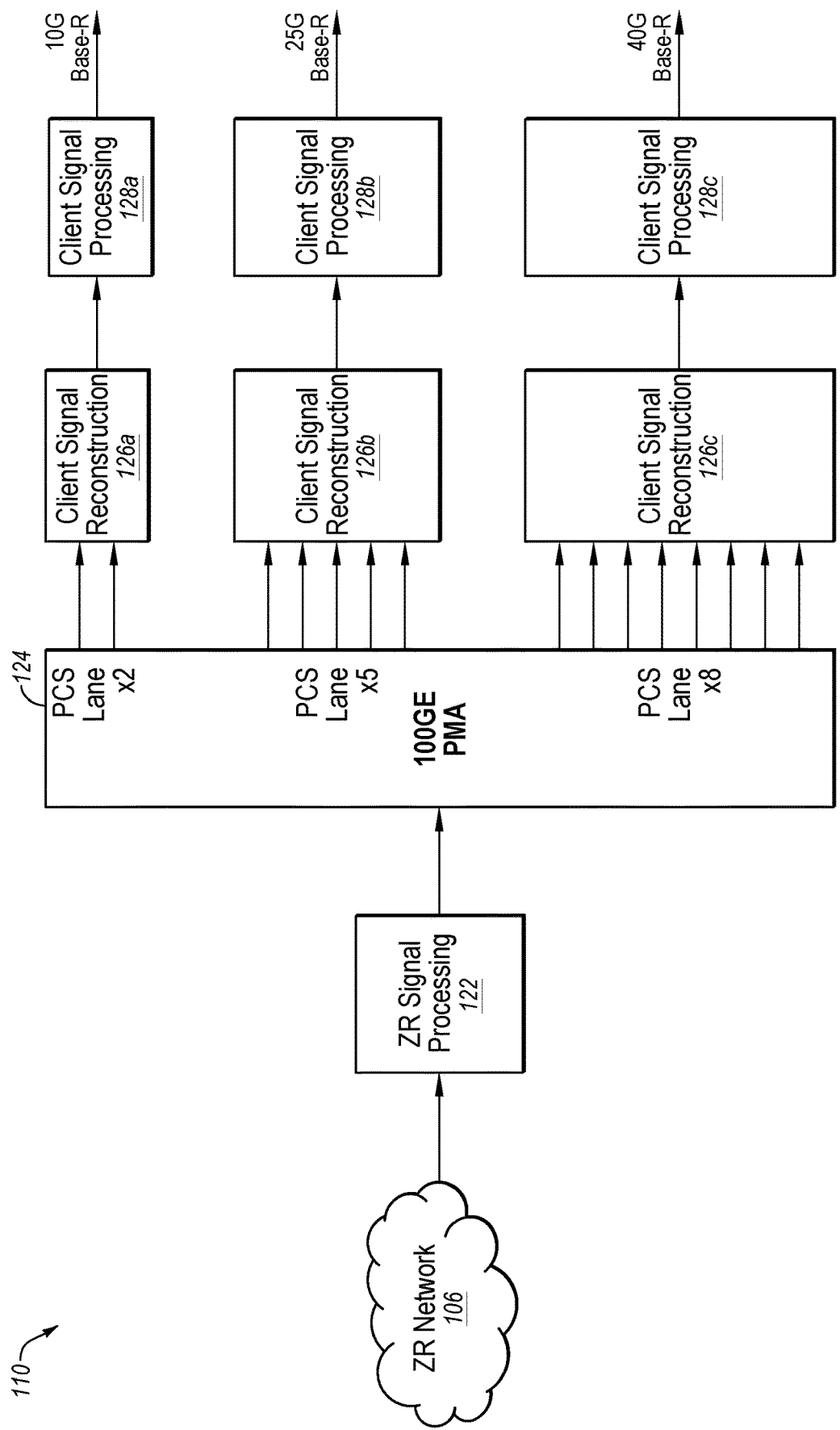
FIG. 1D illustrates example receive operations that may be performed by the transport devices of FIG. 1A.

FIG. 1D illustrates example receive operations 120 that may be performed by the transport devices 104, according to one or more embodiments of the present disclosure. The receive operations 120 may include operations performed with respect to one or more received channelized ZR signals to extract the client signals included therein.

In the example of FIG. 1D, the receive operations 120 may include ZR signal processing operations 122 ("ZR operations 122") that may be performed with respect to a ZR signal that may be received from the ZR network 106. In some embodiments, the ZR signal may be a 400G ZR signal that includes four 100G ZR signals, in which one or more of the 100G ZR signals may be a channelized ZR signal such as described with respect to FIG. 1B. Additionally or alternatively, the ZR signal may be a 200G ZR signal that includes two 100G ZR signals, in which one or more of the 100G ZR signals may be a channelized ZR signal such as described with respect to FIG. 1C. In these or other embodiments, the ZR signal may be a 100G channelized ZR signal.

The ZR operations 122 may include deconstructing the received ZR signal into one or more individual channelized ZR signals. For example, in instances in which the received ZR signal is a 400G ZR signal that includes four 100G ZR signals (in which one or more of the 100G ZR signals is a channelized ZR signal), the ZR operations 122 may include extracting each 100G ZR signal from the 400G ZR signal. As another example, in instances in which the received ZR signal is a 200G ZR signal that includes two 100G ZR signals (in which one or more of the 100G ZR signals is a channelized ZR signal), the ZR operations 122 may include extracting each 100G ZR signal from the 100G ZR signal. As another example, in instances in which the received ZR signal is just a channelized ZR signal, the ZR operations may include receiving the channelized ZR signal.

The ZR operations 122 may include any suitable operations that may be performed to obtain the channelized ZR signal from the received ZR signal. For example, the ZR operations may include identifying 100G ZR signals from a 400G ZR signal or a 200G ZR signal based on respective alignment markers associated with the individual 100G ZR signals. In these or other embodiments, the ZR operations 122 may include removing such alignment markers after separating out the individual ZR signals. In these or other embodiments, the ZR operations 122 may include reading information to determine that the client signals that are carried by the channelized ZR signal are transported over a collection of TDM multiplexed sub-signal resources (e.g., TDM multiplexed 5G resources). For example, in some embodiments, the MSI overhead information specifies such information at a source adaptation function (OpenZR-Extended) performed at ZR operations 118. In these or other embodiments, such information is used to reconstruct the client signals at a sink adaptation function (OpenZR-Extended) performed at ZR operations 122.

The receive operations 120 may also include demuxing operations 124. The demuxing operations 124 may be performed with respect to the channelized signal after the ZR operations 122. The demuxing operations 124 may include performing reverse TDM operations to separate the individual sub-signals from the channelized signals. In these or other embodiments, the demuxing operations 124 may identify the different sub-signals to separate the sub-signals based on the alignment markers associated with the respective sub-signals. In these or other embodiments, the demuxing operations 124 may include communicating the different sub-signals to different respective PCS lanes. In some embodiments, the PCS lanes of the respective sub-signals may be identified based on the indicators included in the respective sub-signals that indicate from where the respective sub-signals derived. For example, the information in the MSI overhead fields may indicate from which client signal the respective sub-signals derived and such information may also indicate to which PCS lane to send such information.

In the illustrated example, the channelized signal may include 5G sub-signals in which two of the 5G sub-signals may be designated as being combined into a 10G first client signal, five of the 5G sub-signals may be designated as being combined into a 25G second client signal, and eight of the 5G sub-signals may be designated as being combined into a 40G third client signal. In these or other embodiments, the channelized signal may include other 5G sub-signals not explicitly discussed.

The receive operations may include reconstruction operations 126 in some embodiments. The reconstruction operations 126 may include reconstructing client signals from the respective sub-signals. For example, reconstruction operations 126a may include combining the two sub-signals designated for the first client signal into the 10G first client signal. Additionally or alternatively, reconstruction operations 126b may include combining the five sub-signals designated for the second client signal into the 25G second client signal. As another example, reconstruction operations 126c may include combining the eight sub-signals designated for the third client signal into the 40G second client signal.

The reconstruction operations 126 may include any suitable technique for performing the combining. For example, the reconstruction operations 126 may include removing the alignment markers associated with the respective sub-signals. In these or other embodiments, the reconstruction operations 126 may include interleaving the respective sub-signals to generate the respective client signals. Additionally or alternatively, the reconstruction operations 126 may include performing descrambling operations to descramble the scrambling that may be performed with respect to corresponding transmit operations performed with respect to the reconstructed client signals.

The receive operations may also include client signal processing operations 128 ("client signal operations 128") that may be performed with respect to the respective client signals. For example, in the illustrated example of FIG. 1D, client signal operations 128a may be performed with respect to the first client signal, client signal operations 128b may be performed with respect to the second client signal, and client signal operations 128c may be performed with respect to the third client signal. The client signal operations 128 may include scrambling the respective client signals, inserting or removing inter-frame gaps in the respective client signals, etc. Following the client signal operations 128, the respective client signals may be communicated to a designated client device 102, as indicated by the routing instructions included therein.

Modifications, additions, or omissions may be made to FIGS. 1A-1D without departing from the scope of the present disclosure. For example, the system 100 may include more elements than those explicitly illustrated and/or described. Additionally, the different elements of the system 100 may be organized into a same device or two or more different devices. Further, the signal rates described with respect to FIGS. 1A-1D are given as examples. For instance, in some embodiments, one or more client signals may be 50G signals.

Figure 2:
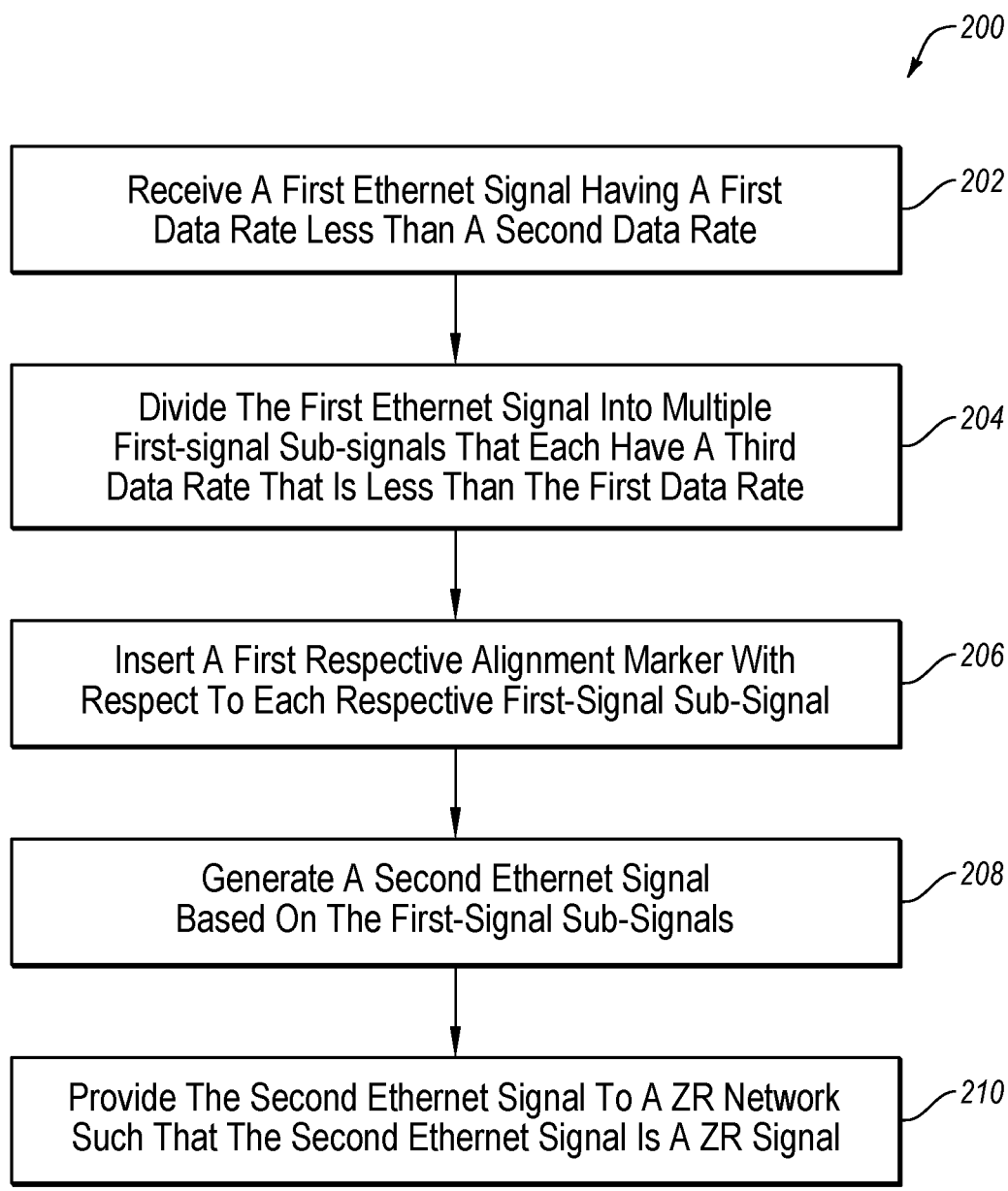
FIG. 2 is a flow chart of an example method of generating a channelized ZR signal.

FIG. 2 is a flow chart of an example method 200 of generating a channelized ZR signal, arranged in accordance with at least some embodiments of the present disclosure. The method 200 may be implemented by any suitable system such as the transport devices 104 described above. Although illustrated as discrete steps, various steps of the method 200 may be divided into additional steps, combined into fewer steps, or eliminated, depending on the desired implementation. Additionally, the order of performance of the different steps may vary depending on the desired implementation.

The method 200 may include a block 202, at which a first Ethernet signal may be received. The first Ethernet signal may have a first data rate that is less than a second data rate, the second data rate may be a ZR data rate. By way of example, the client signals described above with respect to FIG. 1A or 1B may be examples of the first Ethernet signal.

At block 204, the first Ethernet signal may be divided into multiple first-signal sub-signals that each have a third data rate that is less than the first data rate. By way of example, the sub-signals described above with respect to FIG. 1A or 1B may be examples of the first-signal sub-signals.

At block 206, a first respective alignment marker may be inserted with respect to each respective first-signal sub-signal of the plurality of first-signal sub-signals. The first alignment markers may be analogous to those described above with respect to FIGS. 1A-1D.

At block 208, a second Ethernet signal having the second data rate may be generated. The generating of the second Ethernet signal may be based on the first-signal sub-signals such that the second Ethernet signal includes the first-signal sub-signals. The respective first-signal sub-signals may be delineated in the second Ethernet signal by their respective first alignment markers. The signal 150 of FIG. 1C may be an example of the second Ethernet signal.

At block 210, the second Ethernet signal may be provided to a ZR network such that the second Ethernet signal is a ZR signal. In some embodiments, the ZR processing operations 118 of FIG. 1B may be an example of the operations that may be performed at block 210.

Modifications, additions, or omissions may be made to the method 200 without departing from the scope of the present disclosure. For example, the outlined steps and operations are only provided as examples, and some of the steps and operations may be optional, combined into fewer steps and operations, or expanded into additional steps and operations without detracting from the essence of the disclosed embodiments.

For example, in some embodiments, the method 200 may include inserting a respective indicator in each respective first-signal sub-signal in which the respective indictor indicates that the respective first-signal sub-signal derived from the first Ethernet signal. In these or other embodiments, the indicator may be included in an MSI overhead field, such as described above.

Further, the method 200 may include operations related to combining the second Ethernet signal into another ZR signal, such as in instances in which the second Ethernet signal is a 100G channelized ZR signal included with a 200G or a 400G ZR signal. In these or other embodiments, the method 200 may accordingly include inserting a second alignment marker with respect to the second Ethernet signal in which the second alignment marker delineates the second Ethernet signal. Additionally or alternatively, the operations of the method 200 may include generating a third Ethernet signal (e.g., a 200G or 400 G ZR signal) having a fourth data rate that is greater than the second data rate. The generating of the third Ethernet signal may include combining the second Ethernet signal with one or more other ZR signals that each have the second data rate, wherein the second Ethernet signal is delineated in the third Ethernet signal by the second alignment marker. The generation of the third Ethernet signal may be performed according to the ZR signal processing operations 118 described with respect to FIG. 1B in some embodiments.

Figure 3:
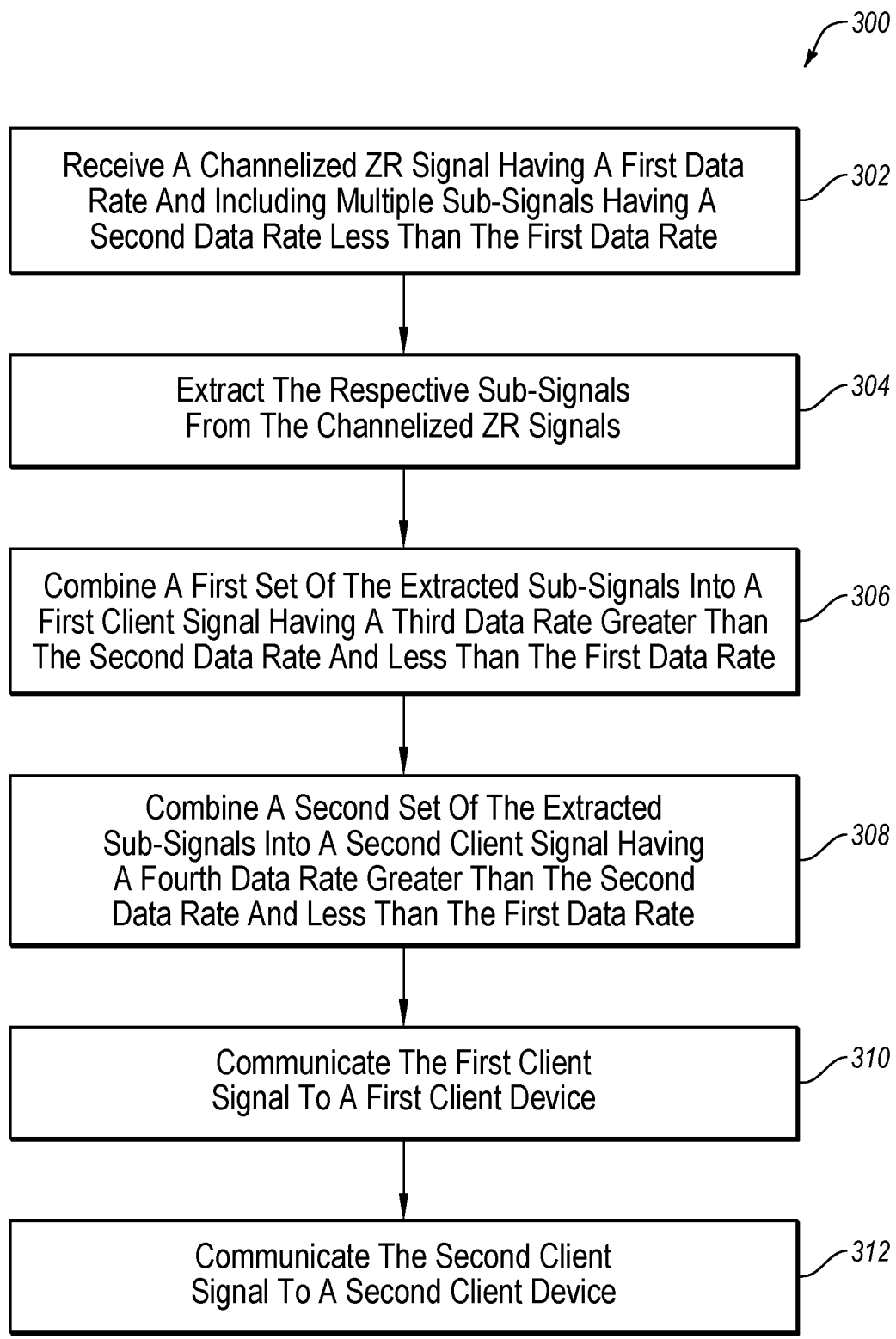
FIG. 3 is a flow chart of an example method of deconstructing a channelized ZR signal.

FIG. 3 is a flow chart of an example method 300 of deconstructing a channelized ZR signal, arranged in accordance with at least some embodiments of the present disclosure. The 300 may be implemented by any suitable system such as the transport devices 104 described above. Although illustrated as discrete steps, various steps of the method 300 may be divided into additional steps, combined into fewer steps, or eliminated, depending on the desired implementation. Additionally, the order of performance of the different steps may vary depending on the desired implementation.

The method 300 may include a block 302, at which a channelized ZR signal having a first data rate may be received. Further the channelized ZR signal may include multiple sub-signals having a second data rate less than the first data rate. The sub-signals may be delineated in the channelized ZR signal by respective alignment markers associated with the respective sub-signals of the plurality of sub-signals. In some embodiments, the first data rate may be a 100G ZR rate and the second data rate may be a 5G Ethernet MAC rate. For example, the channelized ZR signal may be a 100G channelized ZR signal such as described above and the sub-signals may be sub-signals that derived from one or more client signals, such as described above.

At block 304, the respective sub-signals may be extracted from the channelized ZR signals, such as described above with respect to the receive operations 120 of FIG. 1D.

At block 306, a first set of the extracted sub-signals may be combined into a first client signal, such as described above with respect to the receive operations 120 of FIG. 1D. The first client signal may have a third data rate that is greater than the second data rate and less than the first data rate. For example, the third data rate may be a 10G MAC Ethernet rate, a 25G MAC Ethernet rate, a 40G MAC Ethernet rate, or a 50G MAC Ethernet rate. In these or other embodiments, the first set of the extracted sub-signals may be combined into the first client signal based on each sub-signal of the first set of extracted sub-signals including a same indicator in an MSI overhead field of a respective packet included in the respective sub-signals of the first set of extracted sub-signals, such as described above.

At block 308, a second set of the extracted sub-signals may be combined into a second client signal, such as also described above with respect to the receive operations 120 of FIG. 1D. In these or other embodiments, the second set of the extracted sub-signals may be combined into the second client signal based on each sub-signal of the second set of extracted sub-signals including a same indicator in an MSI overhead field of a respective packet included in the respective sub-signals of the second set of extracted sub-signals, such as described above.

The second client signal may have a fourth data rate that is greater than the second data rate and less than the first data rate. For example, the fourth data rate may be a 10G MAC Ethernet rate, a 25G MAC Ethernet rate, a 40G MAC Ethernet rate, or a 50G MAC Ethernet rate. In some embodiments, the third data rate and the fourth data rate may be the same. For example, each of the first client signal and the second client signal, generated respectively at blocks 306 and 308, may have a 10G MAC Ethernet rate. Additionally or alternatively, the third data rate and the fourth data rate may be different. For example, the first client signal may have a 10G MAC Ethernet rate and the second client signal, may have a 25G MAC Ethernet rate.

At block 310, the first client signal may be communicated to a first client device, such as a first router. At block 312, the second client signal may be communicated to a second client device, such as a second router.

Modifications, additions, or omissions may be made to the method 300 without departing from the scope of the present disclosure. For example, the outlined steps and operations are only provided as examples, and some of the steps and operations may be optional, combined into fewer steps and operations, or expanded into additional steps and operations without detracting from the essence of the disclosed embodiments.

In some embodiments described herein, one or more elements (e.g., client devices, transport devices, etc.) may include the use of a computing system. For example, a computing system may be used to control operations related to generating or deconstructing channelized ZR signals. The computing system may include hardware, software, or a combination of both.

Figure 4:
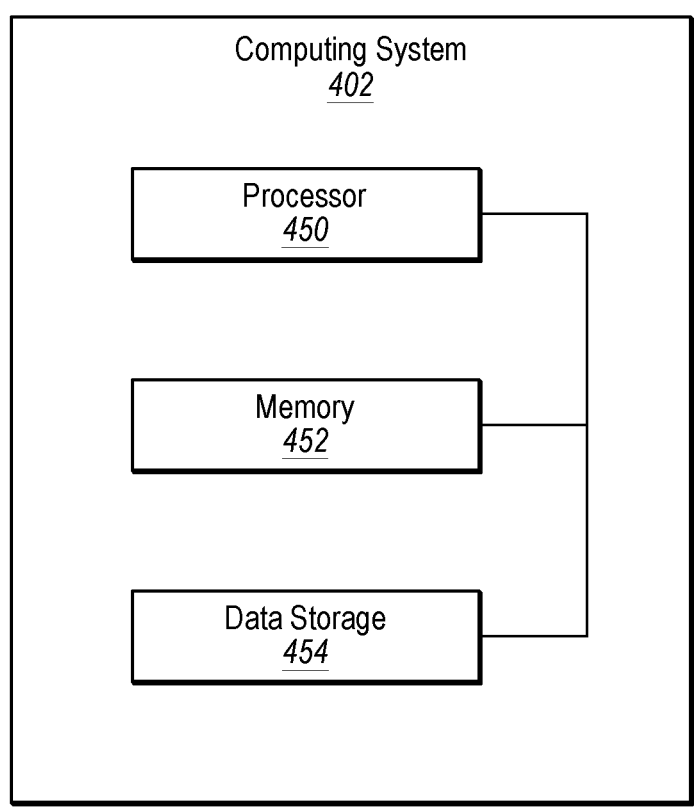
FIG. 4 illustrates a block diagram of an example computing system, all arranged in accordance with some embodiments of the present disclosure.

FIG. 4 illustrates a block diagram of an example computing system 402, according to at least one embodiment of the present disclosure. The computing system 402 may be configured to implement or direct one or more suitable operations described in the present disclosure. The computing system 402 may include a processor 450, a memory 452, and a data storage 454. The processor 450, the memory 452, and the data storage 454 may be communicatively coupled.

In general, the processor 450 may include any suitable computer, computing entity, or processing device including various computer hardware or software modules and may be configured to execute instructions stored on any applicable computer-readable storage media. For example, the processor 450 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 4, the processor 450 may include any number of processors configured to, individually or collectively, perform or direct performance of any number of operations described in the present disclosure. Additionally, one or more of the processors may be present on one or more different electronic devices, such as different servers.

In some embodiments, the processor 450 may be configured to interpret and/or execute program instructions and/or process data stored in the memory 452, the data storage 454, or the memory 452 and the data storage 454. In some embodiments, the processor 450 may fetch program instructions from the data storage 454 and load the program instructions in the memory 452. After the program instructions are loaded into memory 452, the processor 450 may execute the program instructions.

The memory 452 and the data storage 454 may include computer-readable storage media for carrying or having computer-executable instructions or data structures stored thereon. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other non-transitory storage medium which may be used to store particular program code in the form of computer-executable instructions or data structures and which may be accessed by a general-purpose or special-purpose computer. In these and other embodiments, the term "non-transitory" as explained in the present disclosure should be construed to exclude only those types of transitory media that were found to fall outside the scope of patentable subject matter in the Federal Circuit decision of *In re Nuijten*, 500 F.3d 1346 (Fed. Cir. 2007).

Combinations of the above may also be included within the scope of computer-readable storage media. Computer-executable instructions may include, for example, instructions and data configured to cause the processor 450 to perform a certain operation or group of operations.

Modifications, additions, or omissions may be made to the computing system 402 without departing from the scope of the present disclosure. For example, in some embodiments, the computing system 402 may include any number of other components that may not be explicitly illustrated or described.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
    receiving a first Ethernet signal having a first data rate less than a second data rate, the second data rate being a ZR data rate;
    dividing the first Ethernet signal into a plurality of first-signal sub-signals that each have a third data rate that is less than the first data rate;
    inserting a first respective alignment marker with respect to each respective first-signal sub-signal of the plurality of first-signal sub-signals;
    generating a second Ethernet signal having the second data rate, the generating of the second Ethernet signal being based on the plurality of first-signal sub-signals such that the second Ethernet signal includes the plurality of first-signal sub-signals, the respective first-signal sub-signals being delineated in the second Ethernet signal by their respective first alignment markers;
    providing the second Ethernet signal to a ZR network such that the second Ethernet signal is a ZR signal;
    inserting a second alignment marker with respect to the second Ethernet signal, the second alignment marker delineating the second Ethernet signal; and
    generating a third Ethernet signal having a fourth data rate that is greater than the second data rate, the generating of the third Ethernet signal including combining the second Ethernet signal with one or more other ZR signals that each have the second data rate, wherein the second Ethernet signal is delineated in the third Ethernet signal by the second alignment marker.

2. The method of claim 1, wherein the second data rate is a 100 Gigabit ZR rate and the fourth data rate is a 200 Gigabit ZR rate or a 400 Gigabit ZR rate.

3. The method of claim 1, wherein the first data rate is a 10 Gigabit Ethernet Media Access Control (MAC) rate, a 25 Gigabit Ethernet MAC rate, a 40 Gigabit Ethernet MAC rate, or a 50 Gigabit Ethernet MAC rate.

4. The method of claim 1, wherein the third data rate is a 5 Gigabit Ethernet Media Access Control (MAC) rate.

5. The method of claim 1, further comprising inserting a respective indicator in each respective first-signal sub-signal in which the respective indictor indicates that the respective first-signal sub-signal derived from the first Ethernet signal.

6. The method of claim 5, wherein the respective indicator is included in a media slot identifier overhead field of a respective packet included in the respective first-signal sub-signal.

7. The method of claim 1, further comprising:
    receiving a third Ethernet signal having a fourth data rate different from the first data rate and less than the second data rate;
    dividing the third Ethernet signal into a plurality of third-signal sub-signals that each have the third data rate; and
    inserting a second respective alignment marker with respect to each respective third-signal sub-signal of the plurality of third-signal sub-signals, wherein:

the generating of the second Ethernet signal is further based on the plurality of third-signal sub-signals such that the second Ethernet signal also includes the plurality of third-signal sub-signals; and the respective third-signal sub-signals are delineated in the second Ethernet signal by their respective second alignment markers.

8. A system comprising:

a first transport device including a processor configured to perform first operations, the first operations comprising:

receiving a first Ethernet signal having a first data rate less than a second data rate, the second data rate being a ZR data rate;

dividing the first Ethernet signal into a plurality of first-signal sub-signals that each have a third data rate that is less than the first data rate;

inserting a first respective alignment marker with respect to each respective first-signal sub-signal of the plurality of first-signal sub-signals;

generating a second Ethernet signal having the second data rate, the generating of the second Ethernet signal being based on the plurality of first-signal sub-signals such that the second Ethernet signal includes the plurality of first-signal sub-signals, the respective first-signal sub-signals being delineated in the second Ethernet signal by their respective first alignment markers;

providing the second Ethernet signal to a ZR network such that the second Ethernet signal is a ZR signal; and the first operations further comprising:

inserting a second alignment marker with respect to the second Ethernet signal, the second alignment marker delineating the second Ethernet signal; and generating a third Ethernet signal having a fourth data rate that is greater than the second data rate, the generating of the third Ethernet signal including combining the second Ethernet signal with one or more other ZR signals that each have the second data rate, wherein the second Ethernet signal is delineated in the third Ethernet signal by the second alignment marker.

9. The system of claim 8, the first operations further comprising inserting a respective indicator in each respective first-signal sub-signal in which the respective indictor indicates that the respective first-signal sub-signal derived from the first Ethernet signal.

10. The system of claim 9, wherein the indicator is included in a media slot identifier overhead field of a respective packet included in the respective first-signal sub-signal.

11. The system of claim 8, the first operations further comprising:

receiving a third Ethernet signal having a fourth data rate different from the first data rate and less than the second data rate;

dividing the third Ethernet signal into a plurality of third-signal sub-signals that each have the third data rate; and inserting a second respective alignment marker with respect to each respective third-signal sub-signal of the plurality of third-signal sub-signals, wherein:

the generating of the second Ethernet signal is further based on the plurality of third-signal sub-signals such that the second Ethernet signal also includes the plurality of third-signal sub-signals; and the respective third-signal sub-signals are delineated in the second Ethernet signal by their respective second alignment markers.

12. The system of claim 8, further comprising:

a second transport device configured to perform second operations, the second operations comprising:

receiving the second Ethernet signal;

extracting the respective first signal sub-signals from the second Ethernet signal based on the first alignment markers;

combining the extracted first signal sub-signals into a client signal having the first data rate; and communicating the client signal to a client device.

13. The system of claim 12, wherein the extracted first signal sub-signals are combined into the client signal based on each first signal sub-signal including a same indicator in a media slot identifier overhead field of a respective packet included in the respective first signal sub-signals.

* * * * *